United States Patent [19]
Siebold

[11] 3,973,582
[45] Aug. 10, 1976

[54] FLEXIBLE BAND DEVICE
[75] Inventor: Howard E. Siebold, Libertyville, Ill.
[73] Assignee: Liquid Controls Corporation, North Chicago, Ill.
[22] Filed: Mar. 10, 1975
[21] Appl. No.: 556,639

[52] U.S. Cl.............................. 137/202; 137/192; 137/451; 251/DIG. 2; 267/160
[51] Int. Cl.².................. F16K 24/04; F16K 31/18
[58] Field of Search................ 137/202, 192, 451; 251/DIG. 2; 267/158, 160, 165, 164

[56] References Cited
UNITED STATES PATENTS

| | | | |
|---|---|---|---|
| 2,784,740 | 3/1957 | Stageberg | 251/DIG. 2 |
| 3,452,175 | 6/1969 | Wilkes | 267/158 X |
| 3,605,546 | 9/1971 | Klann | 251/DIG. 2 |
| 3,726,313 | 4/1973 | Pandya | 251/DIG. 2 |
| 3,741,234 | 6/1973 | Siebold | 251/DIG. 2 |

*Primary Examiner*—Alan Cohan
*Attorney, Agent, or Firm*—Edmond T. Patnaude

[57] ABSTRACT

A force translator in the form of an S-shaped flexible band is connected at its center by a double pivot linkage to an axially movable actuator which, in an air eliminator, is a float.

11 Claims, 12 Drawing Figures

FLEXIBLE BAND DEVICE

The present invention relates in general to a flexible band device which may be used as a valve or mechanical force translator, and it also relates to a new and improved liquid and air separator employing an S-shaped flexible band as the valve element.

BACKGROUND OF THE INVENTION

Various roller band devices of the type commonly known as Rolamites have been suggested for use in a variety of valving and force transmitting or translating applications. Such devices employ two or more rollers positioned between opposing guideways with a flexible band convoluted over the rollers and attached at its ends to the respective guideways. Such devices are characterized by low frictional forces between the moving members but they are also relatively large and the moving parts are heavy because of the weight of the rollers.

Another prior art type of flexible band device is described in U.S. Pat. No. 3,021,861 to Billeter et al. It employs two or more flexible bands which are rolled onto or off of valve ports to close and open the ports. This type of device is lighter in weight than the Rolamite device, and is widely used in air eliminators or fluid segregators. Inherently, this type of device is unbalanced in the longitudinal direction wherefor the force required to move the bands in one direction is different from that required to move the bands in the other direction. When used in an air eliminator, for example, the bands may be used as valve elements for opening and closing a plurality of ports but they cannot be used for opening one port while closing another port.

SUMMARY OF THE INVENTION

Briefly, there is provided in accordance with the teachings of the present invention a force translating device employing a resilient, flexible band having its end portions fixedly positioned against spaced apart walls with its intermediate portion being free and forming two oppositely facing open loops, and an actuator connected to the center of the band intermediate the loops. An actuating force applied to the actuator causes one portion of the band to roll onto one wall and another portion of the band to roll off the other wall. In this S-band device both the transverse and longitudinal forces are balanced and when used as a valve element a lesser actuator movement is required for a given amount of valve port opening than in the double band configuration of the said Billeter et al patent.

BRIEF DESCRIPTION OF THE DRAWING

Further objects and advantages and a better understanding of the present invention can be had by reference to the following detailed description wherein.

DETAILED DESCRIPTION OF THE INVENTION

Figure 1:
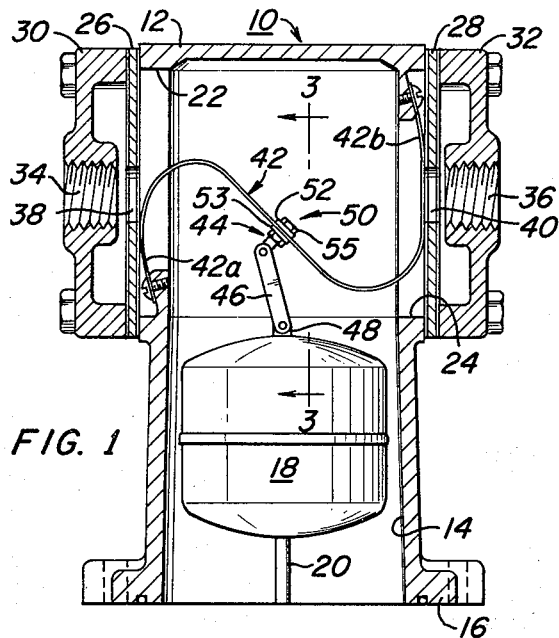
FIG. 1 is a cross-sectional view of a float actuated air eliminator embodying the present invention, the float being illustrated in a low position.

Referring now to FIG. 1, there is shown an air eliminator 10 including a housing member 12 having a float chamber 14 therein. A mounting flange 16 is provided at the base of the housing member 12 for mounting the air eliminator 10 on a liquid flow line with the chamber 14 in communication with and above the line. A float 18 is slidably mounted within the chamber 14 on a vertical stem or rod 20 which is suitably supported at the bottom in fixed relationship with the housing 12 by means of a spider (not shown).

Above the float chamber 14 the housing member 12 is provided with a pair of oppositely disposed openings 22 and 24 over which a pair of mutually parallel valve plates 26 and 28 are respectively mounted. A pair of caps 30 and 32 are located over the valve plates and the caps and valve plates are sealably secured to the housing member 12 by means of a plurality of bolts which extend through aligned mounting holes in the caps and valve plates. The caps 30 and 32 are respectively provided with internally threaded ports 34 and 36 which are aligned with valve ports 38 and 40 in the plates 26 and 28.

In order to open and close the valve ports 38 and 40 in response to vertical movement of the float 18, there is provided in accordance with the present invention a resilient, flexible, imperforate band 42 which is fastened at its respective ends to the housing member 12 adjacent to the valve plates 26 and 28. As shown, the end 42a is fastened to the housing member 12 below the valve port 38, and the opposite end 42b is fastened to the housing member 12 above the valve port 40. The intermediate portion of the band 42 is bent in the shape of the letter "S" so as to provide two open loops, one facing up and the other facing down with the intermediate portion of the band extending in a generally diagonal direction relative to the valve plates 26 and 28. The band 42 is in a state of equilibrium between the inner faces or walls of the plates 26 and 28. In the position shown in FIG. 1 a portion of the band 42 is disposed over the port 40 thereby to seal it from the chamber 14. Moreover, the opposite end portion of the band is disposed away from the port 38 so as to open it to the chamber 14. In the position shown in FIG. 2 the port 38 is closed by the band 42 and the port 40 is open. It will be noted that the intermediate portion of the band 42 is angularly displaced from the position shown in FIG. 1 but is not parallel to the valve plates 26 and 28. Moreover, the center of the band moves in a transverse direction as the band moves between the positions shown in FIGS. 1 and 2.

Figure 2:
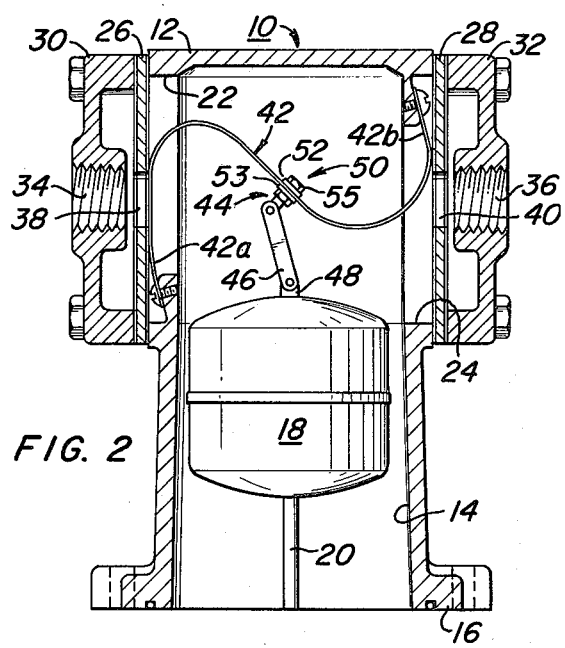
FIG. 2 is a view similar to that of FIG. 1 but showing the float in an elevated position.
Figure 3:
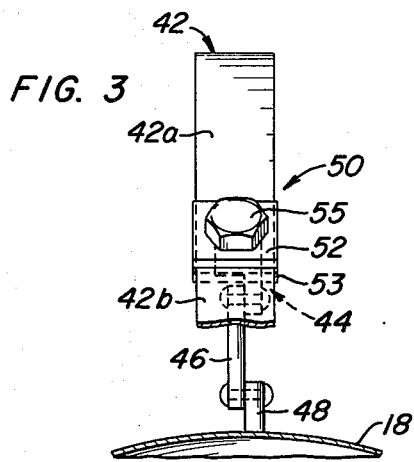
FIG. 3 is a cross-sectional view taken along the line 3—3 of FIG. 1.

In order to move the band 42 between the positions shown in FIGS. 1 and 2, a double pivot linkage 44 connects the float 18 to the center of the band 42 between the two open loops so that as the float 18 moves up in the float chamber 14 the band 42 is rolled onto the plate 26 to close the port 38 and simultaneously rolls off the plate 28 to open the port 40. The linkage 44 comprises an arm 46 pivotally connected at its lower end to an upstanding bracket 48 on the float 18 and pivotally connected at its upper end to a clamp assembly 50. The assembly 50 includes a pair of flat plates 52 and 53 which are tightly clamped to the band 42 over a central opening therein through which extends a bolt 55 to the shank end of which the arm 46 is pivotally connected. Since the hole through the center of the band 42 weakens the band, it is important that the band not be permitted to bend in this area as the float 18 moves up and down. Otherwise, band life is greatly decreased. Accordingly, the clamp plates are elongated in the longitudinal direction of the band.

Figure 9:
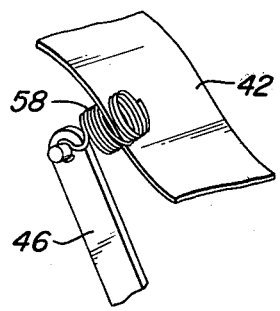
FIG. 9 is a perspective view of a spring connecting the actuator to an S-band.

One alternative means for attaching the band 42 to the linkage arm 46 is illustrated in FIG. 9. As there shown, a coil spring 58 is pivotally attached to the upper end of the arm 46 and one central edge of the band 42 is inserted between adjacent coils of the spring. With this mode of securing the arm 46 to the band 42 no weakening of the band is required and the band is able to seek its own point of equilibrium as in the embodiment of FIG. 1.

The ends 42a and 42b of the band 42 are positioned, in the embodiment of FIG. 1, in planes which intersect the plates 26 and 28 at acute angles so that the band 42 is at all times pressed tightly against the valve plates. These angles are designed to provide the desired magnitude of force holding the band over the adjacent one of the ports 38 and 40.

In the air eliminator 10 the ports 38 and 40 are arranged in mutual alignment but this is not a necessary configuration for all applications of the present invention. For example, the ports may be vertically displaced so that one port is closed before the other is opened and vice versa. Hence ports 34 and 36 are never in mutual communication but open and close sequentially.

It will be apparent that the length of the band 42 must be greater than the distance between the valve plates 26 and 28. However, the shorter the band the sharper are the angles made between the band and the plates. In the prior art flexible band devices such as the Rolamite type and that disclosed in the said Billeter et al patent, the bands are convoluted through 180° or more and thus require a substantially greater stroke of the actuator to open or close the associated valve ports a predetermined amount. Another inherent advantage of the shorter band length is that less band material is required. Also, since both the transverse and longitudinal band forces are equalized, the required actuating force is less than that of the prior art unbalanced devices.

Figure 4:
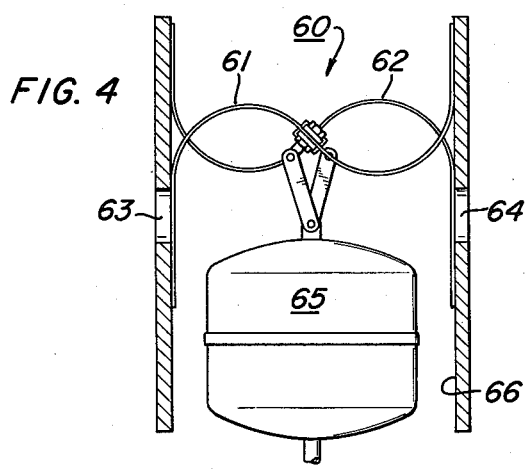
FIG. 4 is a cross-sectional view of another float operated valve employing two S-bands.

Referring now to FIG. 4, there is shown a float operated valve 60 employing two resilient flexible bands 61 and 62 for simultaneously opening and closing a pair of valve ports 63 and 64 as a float 65 moves up and down in a float chamber 66. The bands 61 and 62 are mounted side by side and the ports 63 and 64 are respectively disposed opposite the respective bands 61 and 62 such that the band 61 controls the port 63 and the band 62 controls the port 64. Although the use of two bands requires an effective overall band length which is greater than that required in the device of the said Billeter et al patent, the required operating stroke of the float actuator is less.

Figure 5:
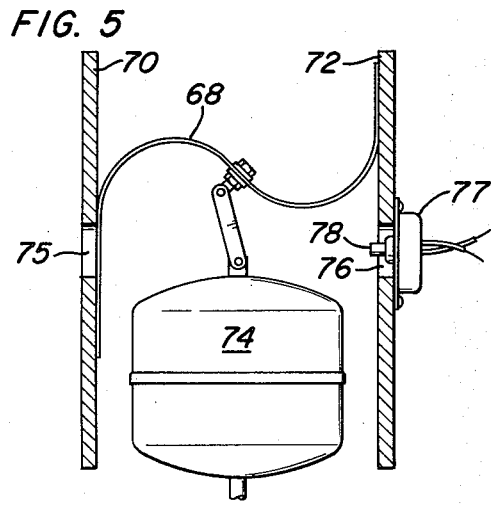
FIG. 5 is a cross-sectional view of a float operated switch employing a single S-band.

Referring to FIG. 5, there is illustrated a combined valve and switch actuator utilizing the S-band configuration of the present invention. As there shown, a flexible, resilient band 68 has its end portions fixed to parallel wall surfaces 70 and 72 and its center portion connected by a double pivot linkage to a float 74. A valve port 75 is provided in the wall 70 and positioned so as to be covered and uncovered by the band 68 as the float 74 moves up and down. An opening 76 is provided in the wall 72 and an electric switch 77 is mounted over the opening 76 with an actuator arm 78 extending inwardly from the wall surface 72. The arm 78 is spring biased outwardly of the switch housing so that the switch is actuated when the float 74 moves into a downward position where the band 68 moves against the arm 78 and exerts an axial actuating force thereon.

Figure 6:
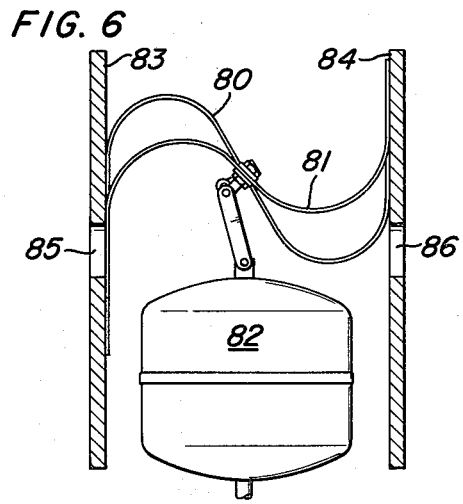
FIG. 6 is a cross-sectional view of a float operated valve employing two S-bands of respectively different lengths.

Referring to FIG. 6, there is illustrated an embodiment of this invention wherein a pair of different length resilient, flexible bands 80 and 81 are connected by a pair of double pivot linkages to a float actuator 82. The bands 80 and 81 are mounted between parallel walls 83 and 84 having ports 85 and 86 therein respectively disposed opposite the bands 80 and 81. If desired, two additional ports may be provided respectively adjacent the ports 85 and 86 so that each band controls two ports. It will be seen that the longitudinal and transverse forces remain balanced irrespective of the use of multiple bands.

Figure 7:
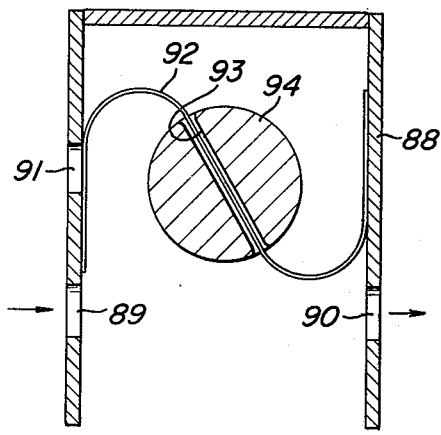
FIG. 7 is a cross-sectional view of a float operated valve usable as a combined air eliminator and cut off valve.

Referring now to FIG. 7, there is shown an air eliminator employing a float chamber housing 88 having liquid inlet and outlet ports 89 and 90 at the bottom. An air outlet port 91 is adapted to be opened and closed by means of an S-shaped flexible, resilient band 92 extending freely through a diametric opening 93 in a spherical float 94. The end portions of the band 92 are secured to the interior walls of the housing. In use, liquid is passed through the air eliminator from the inlet port 89 to the outlet port 90. Any air entrained in the liquid rises to the top of the chamber wherefor the level of liquid drops as air is accumulated above it and the float 94 drops. When the float 94 drops it causes the band 92 to move away from the air outlet port 91 and to move over the liquid outlet 90 thereby cutting off the flow of liquid until the accumulated air has escaped and the float 94 has risen to again close the port 91 and open the port 90.

Figure 8:
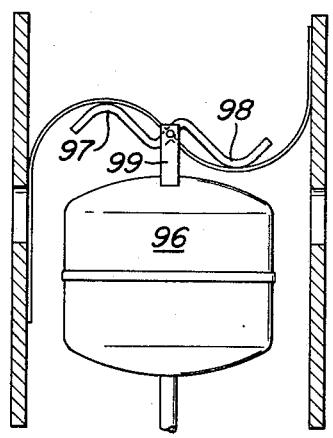
FIG. 8 is a cross-sectional view of a float actuated S-band valve embodying another aspect of the present invention.

FIG. 8 illustrates another alternative means for connecting a float actuator 96 to the S-shaped flexible band. In this embodiment of the invention a pair of members 97 and 98 are fixedly connected to a post 99 and extend above and below the loops in the band. As the float 96 moves down the member 98 pushes the band down and when the float moves up the member 97 pushes the band up.

Figure 10:
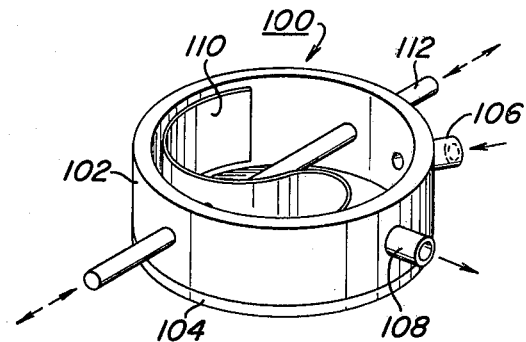
FIG. 10 is a perspective view of another valve embodying the present invention.

In FIG. 10 there is shown a valve 100 comprising an annular housing member 102 to which top and bottom cover plates 104 are sealably secured. Only the bottom cover is shown in the drawing. An inlet port 106 and an outlet port 108 open into the chamber within the housing. An imperforate, flexible, resilient band 110 disposed in the chamber is bent into an S-shape and its end portions are secured to the chamber wall at diametrically opposed locations. One such location is adjacent the outlet port 108. An actuator rod 112 extends through the housing and is secured to the center portion of the band 110. When the rod is moved rearwardly as shown in FIG. 10 the band 110 is rolled over and onto the port 108 to interrupt the flow of fluid through the valve 100. Movement of the rod 112 in the opposite axial direction peels or rolls the band away from the port 108 to open the valve.

Figure 11:
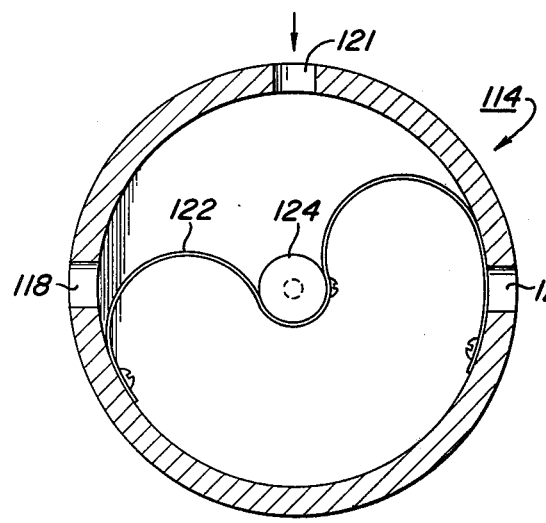
FIG. 11 is a cross-sectional view of a rotary valve employing a resilient, flexible band as the valve member.

Referring to FIG. 11, a three-way valve 114 comprises an annular housing 116 having outlet ports 118 and 120 and an inlet port 121. A flexible resilient band 122 is affixed near its ends to the housing 116 and near its center to a rotatable actuator 124. Rotation of the actuator 124 in a clockwise direction closes the port 118 and opens the port 120. Rotation of the actuator 124 in the counterclockwise direction opens the port 118 and closes the port 120. In an intermediate position both of the ports 118 and 120 are closed.

Figure 12:
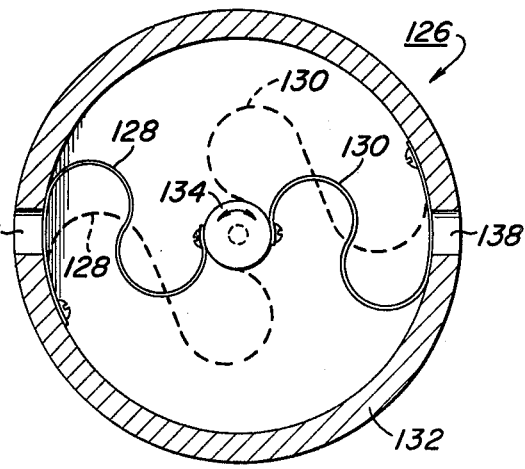
FIG. 12 is a rotary valve employing two opposed S-band valve elements.

FIG. 12 shows a valve 126 employing two flexible resilient bands 128 and 130 mounted in an annular housing 132 between a centrally disposed rotatable actuator 134 and opposite locations on the chamber wall adjacent ports 136 and 138. The valve is shown in a closed condition. Rotation of the actuator in a counterclockwise direction peels the bands 128 and 130 away from the ports 136 and 138 to open the valve. Clockwise rotation of the actuator 134 closes the valve.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:
1. A device of the class described, comprising
an elongated, resilient, flexible band,
guide means having spaced apart guide wall sections between which said band is disposed,
the distance between said wall sections being less than the length of said band,
spaced apart portions of said band being fixedly positioned relative to and against each of said wall portions,
the portion of said band intermediate the wall engaging portions forming two oppositely facing open loops,
said loops being open throughout an angle greater than one hundred eighty degrees, and
actuator means connected to the intermediate portion of said band at a fixed position thereon for rolling said band onto one of said wall sections and off of the other of said wall sections.
2. A device according to claim 1 comprising
a multiple pivot linkage connecting said actuator means to said intermediate portion of said band.
3. A device according to claim 2 wherein
said actuator means is connected to the center of the intermediate portion of said band.
4. A device according to claim 3 comprising
means maintaining the central portion of said band in a planar configuration.
5. A device according to claim 4 wherein
said means maintaining the central portion of said band in a planar configuration is a clamp.
6. A device according to claim 1 comprising
chamber defining means enclosing said walls and said band, and
an opening in one of said walls over which said band is adapted to be rolled and unrolled by said actuator means.
7. A device according to claim 6 wherein
said actuator means comprises a float disposed in said chamber.
8. A device according to claim 6 comprising
an opening in the other of said walls over which said band rolls while being unrolled from over said opening in said one of said walls.
9. A device according to claim 8 wherein
said wall sections are planar, and
said openings are disposed opposite to one another.
10. A device according to claim 1 comprising
a control actuator mounted at one of said walls in a position to be forceably engaged by said band when it is rolled onto said one of said walls.
11. A device according to claim 10 comprising
an electric switch connected to said control actuator for actuation thereby.

* * * * *